United States Patent
Repetto et al.

(10) Patent No.: US 7,781,671 B2
(45) Date of Patent: Aug. 24, 2010

(54) MICRO-COMBUSTOR SYSTEM FOR THE PRODUCTION OF ELECTRICAL ENERGY

(75) Inventors: Piermario Repetto, Orbassano (IT); Piero Perlo, Orbassano (IT); Cosimo Carvignese, Orbassano (IT); Bartolomeo Pairetti, Orbassano (IT); Elena Balocco, Orbassano (IT); Marco Pizzi, Orbassano (IT); Giovanni Brusco, Orbassano (IT); Davide Capello, Orbassano (IT); Denis Bollea, Orbassano (IT); Rossella Monferino, Orbassano (IT)

(73) Assignee: C.R.F. Societá Consortile per Azioni, Turin (IT)

( * ) Notice: Subject to any disclaimer, the term of this patent is extended or adjusted under 35 U.S.C. 154(b) by 1279 days.

(21) Appl. No.: 10/537,754

(22) PCT Filed: Nov. 3, 2003

(86) PCT No.: PCT/IB03/04908

§ 371 (c)(1),
(2), (4) Date: Jun. 6, 2005

(87) PCT Pub. No.: WO2004/055907

PCT Pub. Date: Jul. 1, 2004

(65) Prior Publication Data

US 2005/0284145 A1 Dec. 29, 2005

(30) Foreign Application Priority Data

Dec. 13, 2002 (IT) .......................... TO2002A1083

(51) Int. Cl.
*H01L 31/00* (2006.01)

(52) U.S. Cl. .................. 136/253; 136/246; 136/248

(58) Field of Classification Search .................. 136/253, 136/248
See application file for complete search history.

(56) References Cited

U.S. PATENT DOCUMENTS 3,331,707 A 7/1967 Werth (Continued)

FOREIGN PATENT DOCUMENTS

DE 2919743 A * 11/1980 .................. 136/253

(Continued)

OTHER PUBLICATIONS

Andriesh, Physics and applications of Non crystalline semiconductors in optoelectronics, 1997, 351.*

(Continued)

*Primary Examiner*—Alexa D Neckel
*Assistant Examiner*—Miriam Berdichevsky
(74) *Attorney, Agent, or Firm*—Nixon & Vanderhye P.C.

(57) ABSTRACT

A system for the production of electrical energy, comprising: a combustion chamber (14) made of material that is able to withstand high temperatures, an injection device (16) connected to said combustion chamber (14) by means of an injection conduit (15), means (17) for supplying combustion support substance into the combustion chamber (14) and means (18) for the removal of gaseous combustion products, means (26) for the selective emission of radiation onto the outer surface of the combustion chamber (14). The combustion chamber (14) is enclosed in a conversion chamber (20) within which are maintained sub-atmospheric pressure conditions, so that a substantial part of the heat developed by the combustion reaction is converted into electromagnetic radiation.

35 Claims, 2 Drawing Sheets

U.S. PATENT DOCUMENTS

| | | | | |
|---|---|---|---|---|
| 3,779,212 A | * | 12/1973 | Wagner | 122/23 |
| 3,924,974 A | * | 12/1975 | Fischbeck et al. | 417/322 |
| 4,090,482 A | * | 5/1978 | Yoshida | 123/676 |
| 4,584,426 A | * | 4/1986 | Nelson | 136/253 |
| 4,776,897 A | | 10/1988 | Goldstein | |
| 5,403,405 A | * | 4/1995 | Fraas et al. | 136/253 |
| 5,512,108 A | * | 4/1996 | Noreen | 136/253 |
| 5,620,531 A | * | 4/1997 | Ikai et al. | 136/263 |
| 5,700,332 A | | 12/1997 | Brown et al. | |
| 6,295,937 B1 | * | 10/2001 | Nakanishi et al. | 110/190 |
| 6,372,979 B1 | | 4/2002 | Streetman | |

FOREIGN PATENT DOCUMENTS

| | | | |
|---|---|---|---|
| EP | 1 179 855 | | 2/2002 |
| EP | 1 179 856 | | 2/2002 |
| JP | 58180767 A | * 10/1983 | 136/253 |

OTHER PUBLICATIONS

International Search Report.

* cited by examiner

MICRO-COMBUSTOR SYSTEM FOR THE PRODUCTION OF ELECTRICAL ENERGY

This application is the US national phase of international application PCT/IB2003/004908 filed 3 Nov. 2003 which designated the U.S. and claims benefit of IT TO2002A001083, dated 13 Dec. 2002, the entire content of which is hereby incorporated by reference.

The present invention relates to a micro-combustor system for the production of electrical energy.

The present invention is based on the physical principle whereby thermal energy produced by a combustion is transformed into electromagnetic energy, which in turn is converted into electrical energy, for instance by means oF photovoltaic cells made of semiconductor material.

The object of the present invention is to provide a micro-combustor system for the production of electrical energy with high efficiency of conversion of the thermal energy into electrical energy.

According to the present invention, this object is achieved by a system having the characteristics set out in the main claim.

Figure 1:
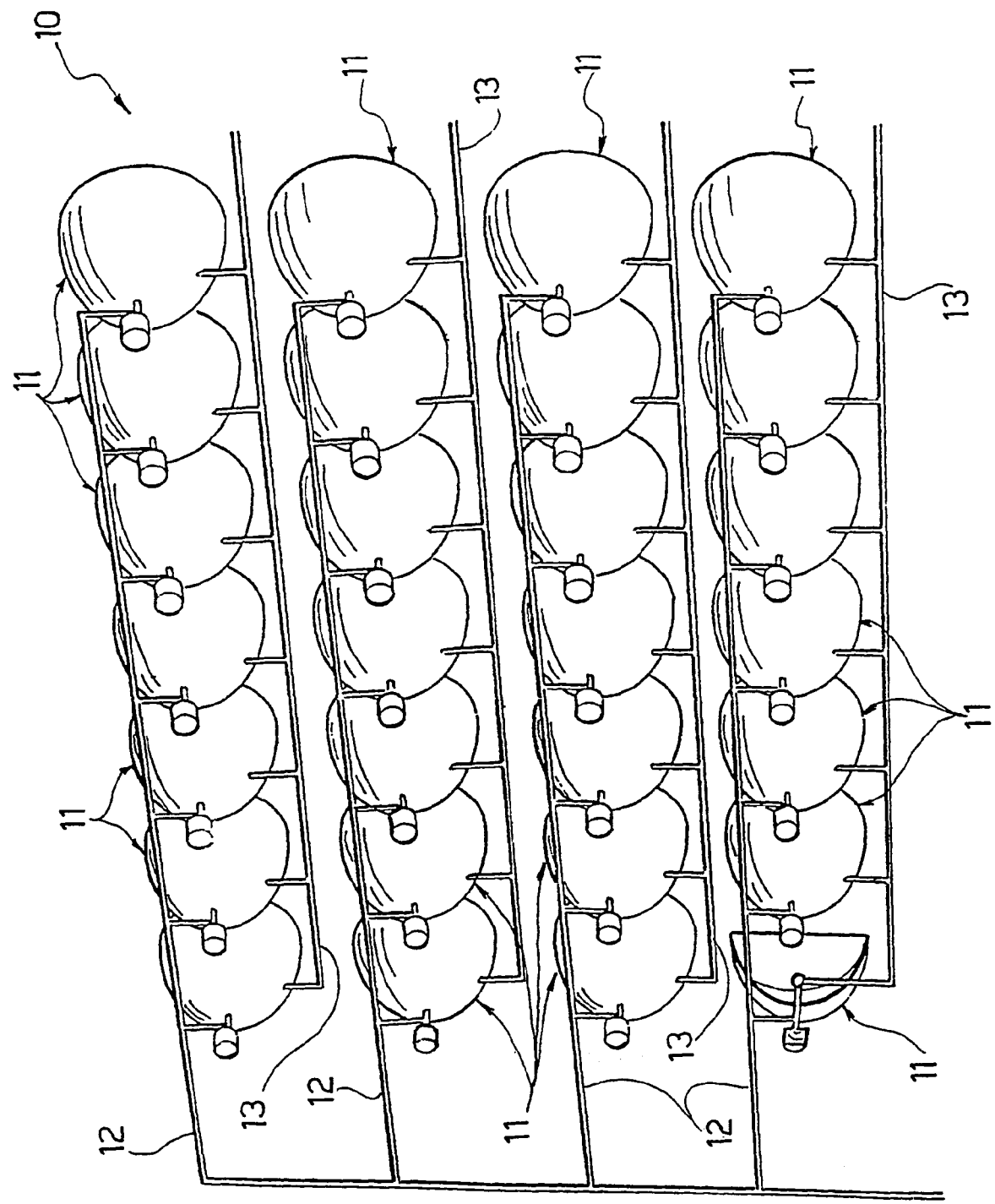
Figure 2:
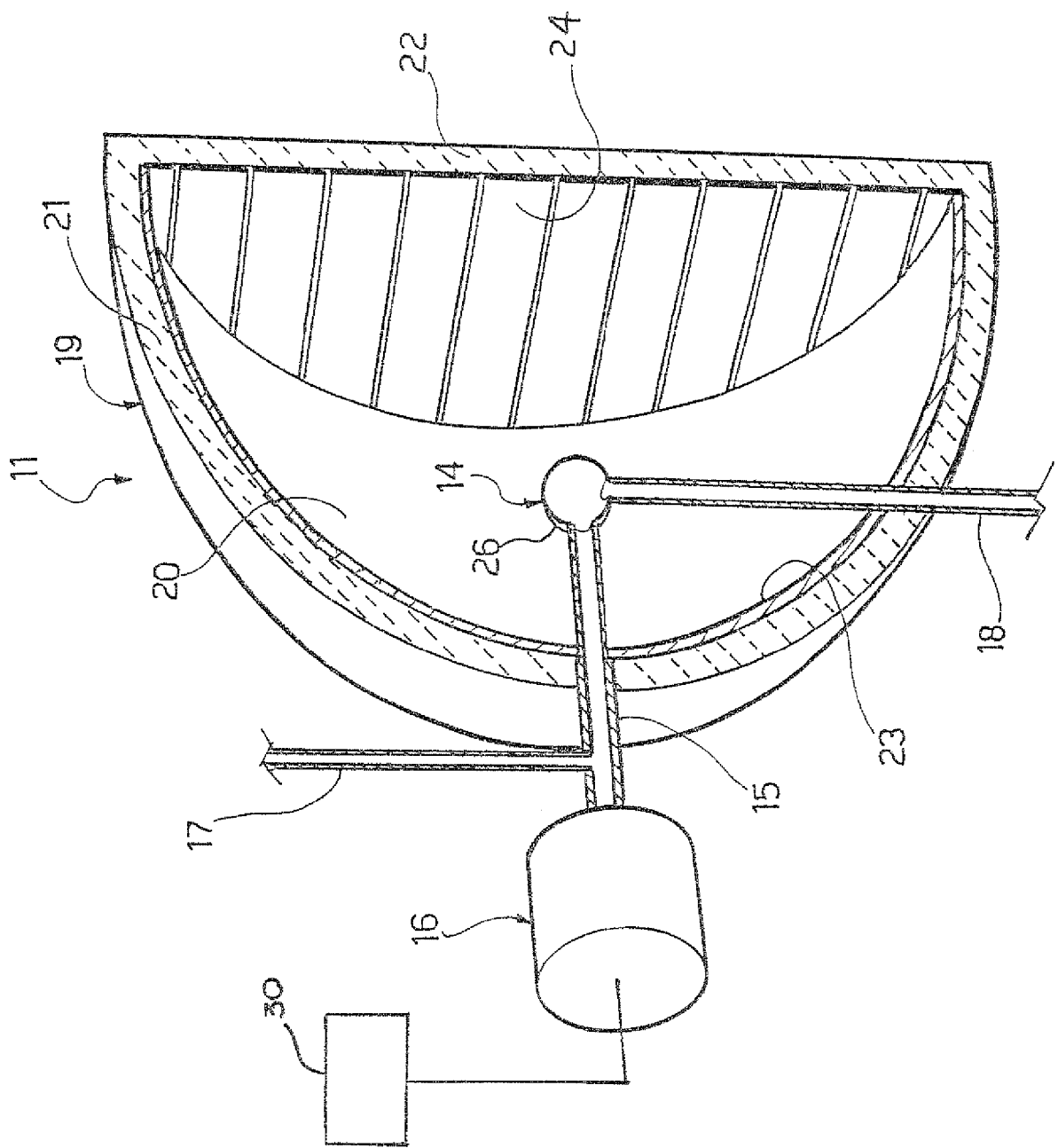

The present invention shall now be described in detail with reference to the accompanying drawings, provided purely by way of non limiting example, in which:

FIG. 1 is a schematic perspective view of a micro-combustor system according to the present invention, and FIG. 2 is a perspective sectioned view of a conversion device indicated by the arrow II in FIG. 1.

With reference to FIG. 1, the number 10 schematically designates a micro-combustor system for the production of electrical energy. The system 10 comprises a plurality of conversion devices 11, electrically connected to each other in series or in parallel, each of which is constructed as described hereafter. The system 10 comprises a pipeline of conduits 12 to supply fuel and combustion supporter to the individual conversion devices 11, a pipeline 13 of exhaust conduits for the removal of gaseous combustion products from the conversion devices 11 and a network of electrical connections, for regulating generated power, for the electrical ignition of the combustors and for transporting the current from the combustor to the load resistance.

With reference to FIG. 2, each conversion device 11 comprises a combustion chamber 14 made of material that is able to withstand high temperature. Preferably, the combustion chamber has spherical shape and is constituted by such material as to withstand temperatures in the order of 1500-2000 K.

The combustion chamber is preferably provided with means for the selective emission of electromagnetic radiation, preferably made in the shape of a lining 26 applied onto the outer surface of the combustion chamber 14. The combustion chamber is preferably constituted by a material with high heat conductivity (for instance tungsten or molybdenum), to allow the heat generated by combustion to reach the outer surface 26. At least a part of the inner surface of the combustion chamber 14 is preferably coated with a material with low heat conductivity of the meso-porous or nano-porous type with porosity coated by catalysing agents, having the function of lowering the combustion activation temperature and reducing emissions of polluting reaction products (for instance nitrogen oxides). The material with low heat conductivity can be interleaved with the material with high heat conductivity in the form of a composite.

The lining 26 preferably has a selective emissivity in a wavelength band of a few hundredths of nanometres. The lining 26 can for instance be constituted by a micro-structure obtained directly on the outer surface of the combustion chamber, or a thin layer of oxide having a highly selective spectral emission (oxide of yttrium, thorium, cerium, europium, erbium, terbium, ytterbium or other rare earth).

The combustion chamber 14 communicates with a fuel injection conduit 15, with a conduit 17 for supplying the combustion support and with a conduit 18 for the exhaust of gaseous reaction products. The conduit 15 preferably has cylindrical shape with a conical terminal segment, in proximity to the micro-injection system 16, with a section that increases outwardly; the purpose of the conical terminal section is to assure that the combustion support substance is aspirated by Venturi effect. The conduits 15, 18 are preferably constituted by ceramic material, or other material with low heat conductivity, to prevent the heat of the combustion chamber to propagate by thermal conduction to the exterior. The outermost part of the exhaust conduit 18 is preferably metallic to allow exhaust gases to release their residual heat before leaving the conversion chamber. The conduit 15 may have an articulated shape, for instance a spiral or a coil, to prevent the combustion products from returning towards the micro-injector. Similarly, the exhaust conduit 18 can have articulated shape to favour the cooling of the combustion products. The supply conduit 17 is preferably connected to the injection conduit 15; alternatively, it can be connected directly to the combustion chamber. The conduit 17 for supplying the combustion supporting substance can be eliminated if a mixture of fuel pre-mixed with liquid or gaseous combustion supporting substance is injected into the injection conduit 15.

The combustion chamber 14 is closed and it does not exchange gaseous products with the exterior except through the conduits 15, 17 and 18.

Each conversion device 11 is provided with a micro-injection device 16 preferably constituted by an ink-jet injector, of the "bubble" type or of the piezoelectric type, able to inject drops of fuel or a combustion-support substance mixture of a volume of a few picolitres and with a frequency which can be controlled by means of a controller (30) from a few kHz to hundreds of kHz. Alternatively, if a gaseous fuel is used, the injection system can be constituted by a miniaturised Bunsen burner. The fuel injected by the injection system 16 penetrates inside the combustion chamber 14 through the injection conduit 15. Preferably, the gaseous fuel injected by the injection device 16 is selected within the group comprising: methane, propane, butane, hydrogen, natural gas or other fuels including the possibility of adding metallic particles to the fuel.

Each conversion device 11 comprises a hollow structure 19 forming a sealed conversion chamber 20, within which is obtained a vacuum or is contained an inert gas at low pressure. The combustion chamber 14 is located inside the conversion chamber 20 and the conduits 15, 18 extend through the walls of the hollow structure 19. The walls of the hollow structure 19 defining the conversion chamber 20 can be made of metal, if a vacuum is obtained in the hollow structure 19, or of ceramic material coated with a high reflectance layer, in all other cases.

The hollow structure 19 comprises an elliptical wall 21 and a planar wall 22, so the conversion chamber 20 has the shape of a rotational semi-ellipsoid with half-axes A and B. The dimensions of the axes of the conversion chamber 20 may vary from a minimum of 3 to 50 times the diameter of the combustion chamber 14. The combustion chamber 14 is preferably positioned in the first focus of the elliptical surface. The inner surface of the elliptical wall 21 is preferably provided with a lining 23 having high reflectance over the entire emission spectrum of the source of radiation.

The planar wall 22 of the hollow structure 19 bears means for converting electromagnetic energy into electrical energy, schematically designated by the reference number 24. Said conversion means are preferably constituted by photovoltaic cells made of semiconductor material, preferably with a band gap in the order of 0.5-0.8 eV in order to maximise the conversion efficiency by Planck radiation with colour temperature of 1500-2000 K. In a preferred embodiment, the photovoltaic cell is of the Schottky type and the active junction is constituted by silicon and aluminium. In the case of the selective electromagnetic energy the material of the cells 24 constituting the conversion means is selected in such a way that the band gap energy is slightly greater than the energy of the photons corresponding to the wavelength of maximum emission, in order to maximise the conversion efficiency at that wavelength.

The exterior face of the conversion means 24 is preferably coated by a reflective metal layer. The inner wall of the conversion means 24 can be coated by a layer operating on the electromagnetic radiation as a band pass filter. Said layer can be a multi-layered dielectric coating, a metallic coating at the percolation state, an anti-reflection micro-structure (for instance a grid with sub-wavelength period) or a photonic crystal.

The conversion means 24 are positioned in correspondence with the plane that is perpendicular to the greater axis of the ellipsoid and passing through the centre of the ellipsoid, in such a way that the radiation emitted by the combustion chamber 4 reaches the photovoltaic means uniformly. Moreover, also by means of the selected geometry, the radiation not absorbed by the conversion means 24 is reflected by the reflecting rear face or by the front surface of the photovoltaic cell 24 and falls back onto the combustion chamber 14 where it is absorbed.

The particular geometry of the conversion chamber 20 causes both the radiation emitted by the combustion chamber and reflected by the photovoltaic chamber 24, and the radiation emitted by the combustion chamber 14 and reflected by the inner walls of the semi-ellipsoid to be concentrated on the combustion chamber 14. This assures a maximum recycling of the electromagnetic energy within the conversion chamber and hence a minimisation of fuel consumption and a maximisation of overall conversion efficiency. The radiation reflected by the inner surface of the semi-ellipsoid or by the photovoltaic cell 24 is re-absorbed by the lining 26 with the same efficiency with which it is emitted thereby.

The heat developed by the fuel-support substance reaction warms the surfaces of the combustion chamber and is wholly converted into electromagnetic radiation. The dimension of the conduits 15, 18 extending within the conversion chamber 20 is such as to minimise the transfer of thermal energy by conduction between the combustion chamber 14 and the hollow structure 19. The radiation emitted inside the conversion chamber 20 impacts on the conversion means 24 which convert electromagnetic radiation into electric energy. The electrical power generated by each conversion device 11 can vary from a few watts to some tens of watts. Each device 11 is provided with electrical contacts (not shown herein) which collect electrical energy produced by the semiconductor cells 24.

Maintaining a vacuum or sub-atmospheric pressure conditions inside the combustion chamber 20 allows to reduce the quantity of thermal energy dispersed by convection. Consequently, nearly all the heat developed by the combustion reaction is converted into electromagnetic radiation which in turn is converted into electrical energy by the conversion means 24. To obtain a vacuum or low pressure conditions within the conversion chamber 20, various known techniques for assembling components in a vacuum may be used.

The invention claimed is:

1. A portable device for the production of electrical energy, comprising a matrix of one or more conversion modules, operating in series or in parallel, wherein each of the conversion modules comprises:
    a combustion chamber having an outer surface defining a substantially spherical shape and made of material that is able to withstand high temperatures,
    an external lining having a selective radiation emissivity in a predetermined wavelength on the outer surface of the combustion chamber,
    means for supplying a combustion support substance into the combustion chamber,
    means for the removal of gaseous combustion products,
    means for igniting the combustion reaction,
    an injection device connected to said combustion chamber by means of an injection conduit to inject the combustion support substance into the combustion chamber,
    a controller for controlling injection frequency of the combustion support substance into the combustion chamber to thereby control power generated by the combustion chamber,
    a conversion chamber within which sub-atmospheric pressure conditions are maintained, wherein the conversion chamber includes:
        (i) an elliptical wall having an interior radiation-reflective surface in the shape of an ellipsoid defining a focus region for focusing radiation reflected thereby; and
        (ii) a planar wall coincident with a plane passing through a center of the ellipsoid and perpendicular to a major axis thereof so as that the conversion chamber has a semi-ellipsoidal shape, wherein the planar wall includes energy-conversion means on an interior surface thereof for converting radiant energy into electrical energy, and wherein
    the combustion chamber is enclosed within the conversion chamber and is positioned in correspondence with the focus region defined by the elliptical wall of said ellipsoid, wherein
    radiation emitted by the combustion chamber and reflected by the energy conversion means on the interior surface of the planar wall and radiation emitted by the combustion chamber and reflected by the radiation reflective inner surface of the elliptical wall are concentrated on the outer surface of the combustion chamber for re-absorption by the external lining thereof.

2. A system as claimed in claim 1, wherein said energy conversion means comprise a plurality of photovoltaic cells.

3. A system as claimed in claim 1, wherein the external lining has a narrow emission band with a peak in correspondence with the wavelength at which the energy-conversion means have the maximum conversion efficiency.

4. A system as claimed in claim 1, wherein the external lining is a material selected from the group consisting of micro-structure metal, metallic or dielectric photonic crystal, oxide or mixture of oxides of rare earths.

5. A system as claimed in claim 1, wherein the outer surface of the combustion chamber has a total area such that the radiant energy emitted by the emission means is equal to the sum of the total thermal energy developed by the combustion reaction at steady state and of that fraction of radiant energy that is reflected by the inner walls of the conversion chamber or by the conversion means and reabsorbed by the combustion chamber.

6. A system as claimed in claim 1, wherein said conversion chamber has axes whose size ranges between 3 and 50 times the diameter of the combustion chamber.

7. A system as claimed in claim 1, wherein said injection device is a head of the ink-jet type.

8. A system as claimed in claim 7, wherein said injection head is of the "bubble" ink-jet type.

9. A system as claimed in claim 7, wherein said injection head is piezoelectric.

10. A system as claimed in claim 1, wherein the combustion chamber is constituted by material with high thermal conductivity and able to withstand high temperatures.

11. A system as claimed in claim 10, wherein part of the inner surface of the combustion chamber is coated with a porous layer of material with low thermal conductivity and able to withstand high temperatures.

12. A system as claimed in claim 11, wherein the porosities of said porous layer are coated by a catalysing material serving the purpose of lowering the activation temperature of the combustion reaction and of limiting the generation of noxious combustion products.

13. A system as claimed in claim 10, wherein the combustion chamber is made of metallic material.

14. A system as claimed in claim 13, wherein said metallic material is constituted by tungsten or molybdenum.

15. A system as claimed in claim 1, wherein said injection conduit and said means for supplying the combustion support substance and said means for extracting the combustion gases are made of a material with low thermal conductivity.

16. A system as claimed in claim 15, wherein an that the outermost segment of the exhaust conduit is made of a material with high thermal conductivity to allow combustion products to yield the residual heat before exiting the conversion chamber.

17. A system as claimed in claim 1, wherein the injection conduit and the means for injecting the combustion support substance independently end into the combustion chamber.

18. A system as claimed in claim 1, wherein the means for the injection of the combustion support substance end into the injection conduit before entering the combustion chamber.

19. A system as claimed in claim 1, wherein the conversion chamber is formed within a structure made of optically polished metallic material.

20. A system as claimed in claim 1, wherein the conversion chamber is defined within a structure made of plastic or ceramic material and coated with a layer of material with high reflectance.

21. A system as claimed in claim 2, wherein a surface of said photovoltaic cells facing the interior of said conversion chamber is coated with an optical lining operating on the long wavelengths of the electromagnetic radiation as a band pass filter with transmittance peak in correspondence with the wavelength at which the photovoltaic cells have the maximum conversion efficiency.

22. A system as claimed in claim 2, wherein said photovoltaic cells are based on Schottky junctions.

23. A system as claimed in claim 22, wherein said Schottky junctions are made of silicon and aluminium.

24. A system as claimed in claim 21, wherein said optical lining is made of a material selected from the group comprising: multilayer dielectric lining, metallic lining at the percolation state, metallic photonic crystal, anti-reflection microstructure.

25. A system as claimed in claim 1, wherein the injection device is constituted by a miniaturised Bunsen burner.

26. A system as claimed in claim 15, wherein the gaseous fuel injected by said injection device belongs to the group comprising: methane, propane, butane, hydrogen, natural gas.

27. A system as claimed in claim 1, wherein the exhaust conduit is internally coated with catalysing material able to neutralise the noxious products of the combustion reaction.

28. A system as claimed in claim 1, wherein the exhaust conduit has an articulated path in order to favour the cooling of the exhaust gas.

29. A system as claimed in claim 1, wherein the injection conduit has an articulated path in order to prevent the combustion products to return towards the injection means.

30. A system as claimed in claim 1, wherein said ignition means are electrical and the combustion is started by an electrical discharge, by a spark or by an incandescent filament.

31. A system as claimed in claim 1, wherein vacuum is obtained inside the conversion chamber.

32. A system as claimed in claim 1, wherein inside the conversion chamber is contained an inert gas at sub-atmospheric pressure.

33. A system as claimed in claim 1, wherein the conversion chamber is constituted by optically polished metallic material.

34. A system as claimed in claim 31, wherein the conversion chamber is constituted by optically polished ceramic material.

35. A system as claimed in claim 1, wherein the inner wall of the conversion chamber is coated by a layer having high reflectance over the whole spectrum of the radiation emitted by the emission means.

* * * * *